Sept. 10, 1968     C. HILL     3,400,777

MOTOR VEHICLES MOVING FOUR-WHEEL DRIVE

Filed Jan. 19, 1966     3 Sheets-Sheet 1

INVENTORS
CLAUDE HILL
BY Mason, Fenwick & Lawrence
ATTORNEYS

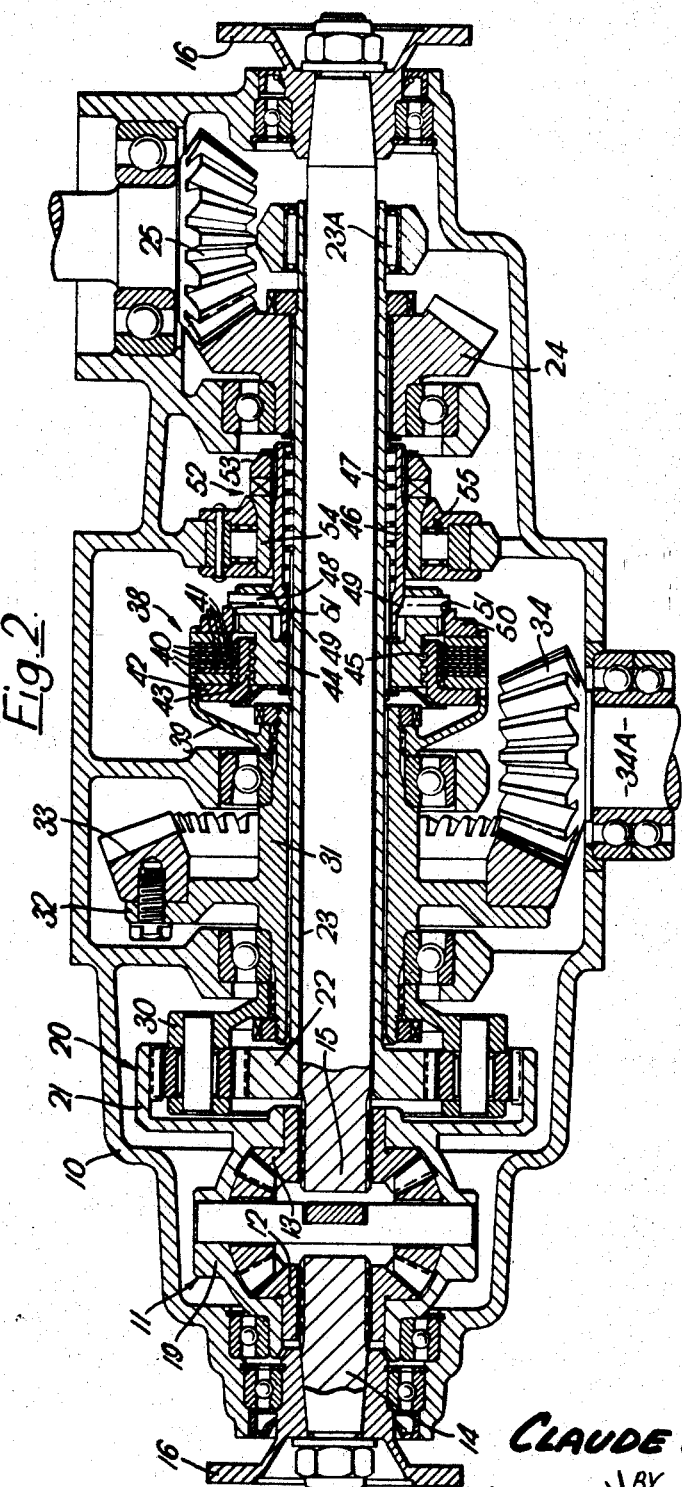

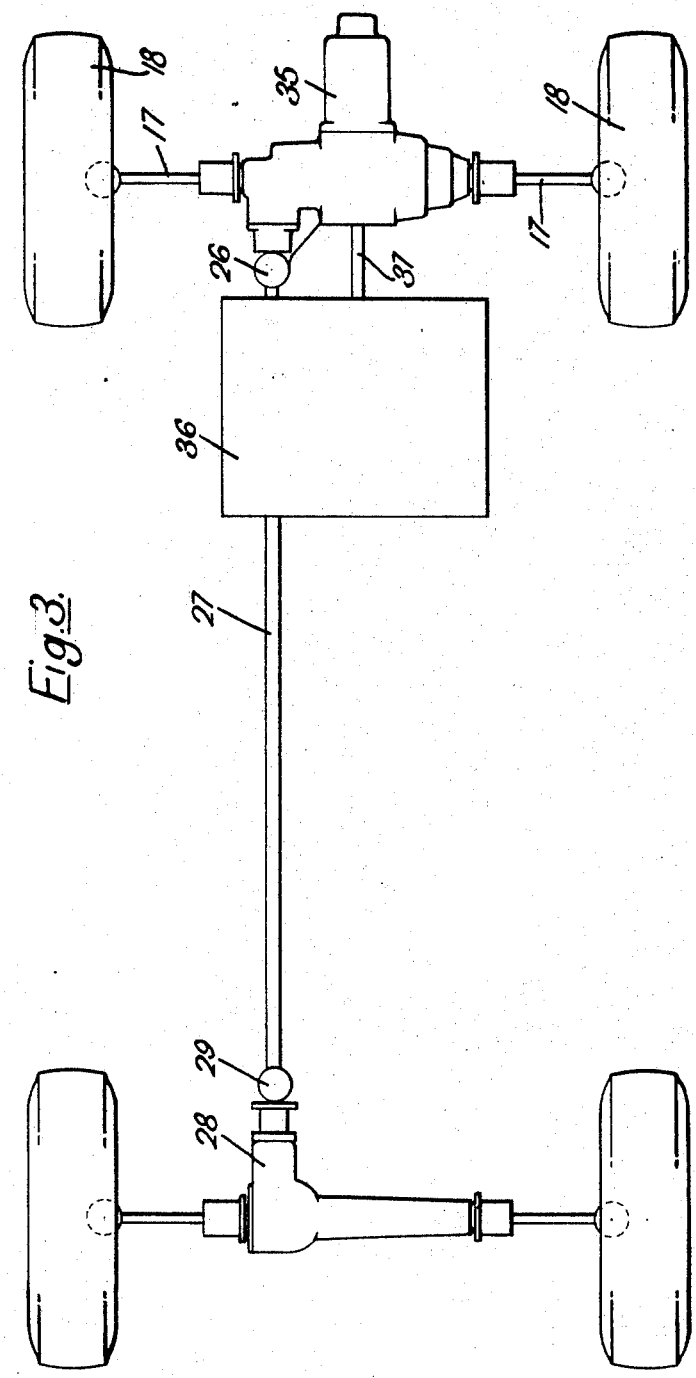

United States Patent Office 3,400,777
Patented Sept. 10, 1968

3,400,777
MOTOR VEHICLES HAVING
FOUR-WHEEL DRIVE
Claude Hill, Kenilworth, England, assignor to
Harry Ferguson Research Limited
Filed Jan. 19, 1966, Ser. No. 521,731
Claims priority, application Great Britain, Jan. 23, 1965,
3,070/65
21 Claims. (Cl. 180—44)

ABSTRACT OF THE DISCLOSURE

In a four-wheel drive motor vehicle, drive is taken from a rear mounted engine by way of a change-speed gear box to a compact transmission unit positioned between the rear wheels and containing, in the one casing, a centre differential gear and the rear interwheel differential gear. The centre differential gear and the rear interwheel differential gear are mutually co-axial. Differential action of the centre differential gear is limited by a one-way overrunning control clutch so that the centre differential gear locks when front wheel speed tends to exceed rear wheel speed by more than a predetermined amount. The casing also incorporates drive transfer gearing to the rear end of a forwardly extending propeller shaft, the front axle ratio and the ratio of the transfer gearing being such that a predetermined "working" of the centre differential gear occurs during normal forward drive, and is used to maintain an unlocked condition of the control clutch during normal forward drive.

The invention relates to four-wheel drive motor vehicle transmission systems, and to transmission units therefor.

The term "four-wheel drive motor vehicle" used herein and in the claims is intended to include motor vehicles having any number of road wheels above four, at least two pairs of which are engine driven.

According to the present invention there is provided a transmission unit for a four-wheel drive motor vehicle, the unit including a transmission casing, a centre differential gear in the casing, said centre differential gear having a first input element and two first output elements, an interwheel differential gear in the casing, said interwheel differential gear having a second input element and two second output elements, the said second output elements and at least one of the said first output elements being mutually co-axial, a first driving connection between the said one of the first output elements and said second input element, input drive means in driving connection with the said first input element, first and second mutually co-axial output drive members projecting from opposite sides of the casing and drivingly connected one to one of the said second output elements and the other to the other of the said second output elements, a third output drive member projecting from the casing, and a second driving connection between the third output drive member and the other of said first output elements.

Preferably, the third output drive member projects from the casing at right angles to the first and second output drive members, and the said second driving connection comprises a tubular shaft sleeving one of the said first and second output drive members, and drive transfer means including first and second drive wheels secured to and co-axial with the said tubular shaft and the third output drive member respectively.

Further, according to the present invention there is provided a four-wheel drive motor vehicle transmission system having front and rear pairs of road wheels, a transmission unit as preferably aforesaid whereof the said first and second output drive members are drivingly connected to respective road wheels of one pair of road wheels, a further interwheel differential gear associated with the other pair of road wheels for driving same, a drive shaft providing a drive from the said third output drive member to the further interwheel differential gear, and a prime mover in driving connection with the said input drive means.

Still, further according to the present invention there is provided a four-wheel drive motor vehicle having front and rear pairs of road wheels, a transmission unit as aforesaid the transmission unit being disposed in the vehicle with the said first and second output drive members extending transversely of the vehicle and drivingly connected to respective ones of one pair of road wheels, a further interwheel differential gear associated with the other pair of road wheels for driving same, a propeller shaft extending longitudinally of the vehicle and providing a driving connection between the said third output drive member and the further interwheel differential gear, and an engine positioned in the vehicle adjacent the said transmission unit and having an output drive connected to the said input drive means.

An embodiment of the invention will now be described, by way of example only, with reference to the accompanying drawings, in which:

FIG. 2 is a sectional plan of the transmission unit of FIG. 1; and

FIG. 3 is a diagrammatic plan of the layout of a four wheel drive motor vehicle transmission system incorporating the transmission unit shown in FIGS. 1 and 2.

Figure 1:
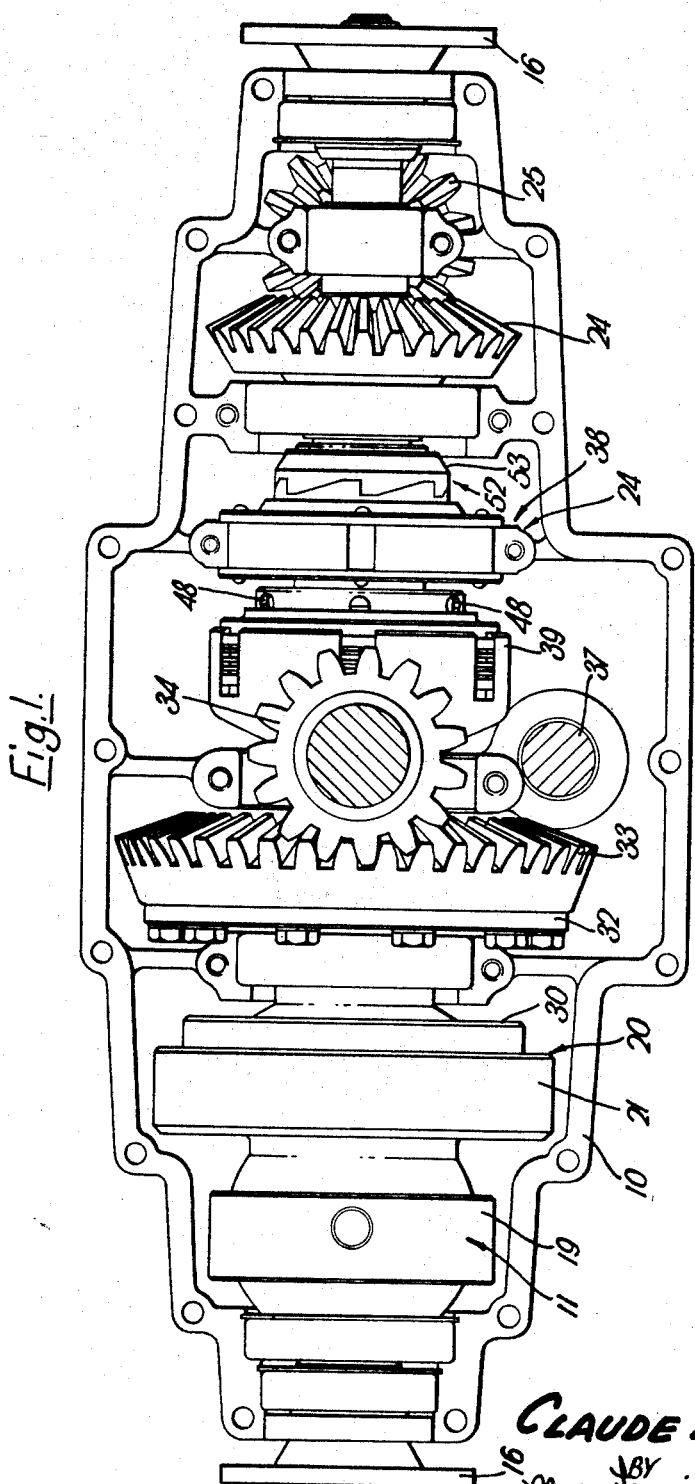
FIG. 1 is a rear elevation of a transmission unit according to the present invention.

Referring to the drawings, the transmission unit shown in FIGS. 1 and 2 comprises an elongated transmission casing 10 containing in one end thereof a rear inter-wheel differential gear 11 of which the output elements are sunwheels 12, 13 which are respectively splined to rear output shafts 14, 15 extending longitudinally and out of the housing 10. Each output shaft has, at its protruding end, a flange 16 for connection to rear half shafts 17 for driving the rear wheels 18 (FIG. 3).

The input element or planet carrier 19 of the rear differential gear is formed integrally with one output element of a planetary spur-type centre differential gear 20, this output element being the annulus 21.

The centre differential gear 20 has a further output element in the form of a sunwheel 22 having a long tubular extension 23 which is supported in a bearing 23A at the other end of the casing 10. The rear differential output shaft 15 extends freely through the sunwheel 22 and extension 23. Keyed to the tubular extension 23 adjacent the bearing 23A is a first drive wheel in the form of a bevel gear wheel 24 which meshes with a second drive wheel in the form of a smaller bevel gear wheel 25 having its axis normal to the shaft 15. These bevel wheels 24, 25 define a drive transfer and are suitably supported in the casing 10 in ball and/or roller bearings. The bevel gearwheel 25 is adapted for connection, through a universal joint 26 (FIG. 3) to a front drive shaft or propeller shaft 27 connected at its other end to the input of the front interwheel differential gear 28 through a universal joint 29.

The input element of the centre differential gear is the planet carrier 30 which is splined to a short hollow shaft 31 sleeving the tubular extension 22 and shaft 15, and supported in bearings in the casing 10. The shaft 31 is formed with a flange 32 which is bolted to a large crownwheel 33. The crownwheel 33 meshes with, and is driven by, a pinion 34 connected to the output shaft 34A of a change-speed gearbox 35 (FIG. 3). The shaft 31, flange 32, crownwheel 33 and pinion 34 define input drive means for the transmission unit.

As FIG. 3 shows, the engine 36 and gearbox 35 are disposed on opposite sides of the casing 10 and the power transmitting shaft 37 from the engine 36 to the gearbox 35 passes through the casing 10 under the pinion 34 (see also FIG. 1). If the engine is of the "flat" type, the front propeller shaft 27 may conveniently pass through the engine crankcase.

The centre differential gear 20 is controlled. That is to say there is provided means for locking this gear when the differential action tends to vary by more than a predetermined amount. The locking means comprises a one-way overrunning clutch device 38 having the following components:

(1) An overrunning member in the form of a cup-shaped outer casing 39 keyed to the short hollow shaft 31 and having axial slots in which is located a first set of friction discs 40;

(2) A second set of friction discs 41 interleaved with the first set 40 and splined to an annular feed member 42 having a bore with helical threads 43 therein and a radial flange which forms a presser for the pack of friction discs at one side;

(3) An underrunning member in the form of a reaction collar 44 secured to the tubular extension 23 and restrained against axial movement thereon, said collar 44 having helical threads 45 on the outer surface thereof engaged with the threads 43 in the bore of the annular feed member 42, the threads 43 and 45 together defining actuating elements for moving the presser axially of the clutch device;

(4) An abutment or support ring 50 which abuts the other side of the pack of friction discs and is splined on the reaction collar 44;

(5) Disabling means including support members or wedge pins 48 slidable radially in the reaction collar 44, the bottom of each pin 48 being inclined so that during normal forward driving of the vehicle, the pins 48 rest on a conical surface 49 of an axially movable body member or sleeve 46, the upper end of the pins 48 projecting beyond the reaction collar 44 and having an inclined portion 51 nearly parallel to the bottom end for engagement with a conical recess in the ring 50, the sleeve 46, being splined on the tubular extension 23 and axially movable against the action of a spring 47 which urges the sleeve 46 into abutment with the reaction collar 44;

(6) Mutually engaging cam faces in the form of a dog clutch 52 having one toothed member 53 secured to, and axially fixed on the sleeve 46, and another toothed body member 54 formed as the inner member of a one-way free wheel clutch 55, the outer member 56 of which is positioned in a suitable seating in the casing 10, and secured to said casing.

The operation of the overrunning clutch device and the disabling means is as follows: When the vehicle is moving normally in a forward direction, and all of the wheels are rotating without slip, the sunwheel 22 is constrained by appropriate selection of the front axle ratio and the ratio of the bevel wheels 24, 25 to rotate at a speed which is slower than that of the annulus 21, and that of the planet carrier 30. That is, the planet carrier 30 "creeps" round relative to the sunwheel 22. This speed difference is used to govern the overrunning clutch device 38, as the speed of the planet carrier 30 is the speed of the cup-shaped member 39, and the speed of the sunwheel 22 is the speed of the reaction collar 44. This speed difference exists between the friction disc sets 40, 41 and therefore the annular feed member 42 experiences a drag which tends to rotate it on the reaction collar 44. Because of the direction and angle of the helical threads 43, 45, the feed member 42 moves away from the pack of friction discs, allowing the planet carrier 30 to continue creeping.

In the event of the front wheel speed tending to exceed the rear wheel speed by more than a predetermined amount such as when, for example, the rear wheels tend to lock or the front wheels tend to spin, the drag effect tends to change direction and hence the annular feed member 42 moves towards and compacts the pack of friction discs 41, 40 thereby clutching the sunwheel 22 to the planet carrier 30 to discontinue the differential action of the gear 20. In this eventuality, the pins 48 act as wedges to support the other side of the pack of discs. The dog clutch 52 is engaged and the free wheel clutch 55 allows the inner member to rotate during all forward motion of the vehicle.

When the vehicle is driven in reverse, the drag effect is such that the overrunning clutch device would lock, but the free wheel 55 and the dog clutch 52 prevent this. The dog clutch is of the inclined face dog type so that when reverse drive is transmitted thereto, the member 53 rides up the inclined faces, with the effect that the sleeve 46 moves axially away from the reaction collar 44, the wedging pins 48 move radially inwards, and the support of the ring 50 is removed from the friction discs. Thus the friction discs 40, 41 may slip and differential action of the gear 20 is permitted. The axial movement of the sleeve 46 is promoted by the one way clutch 55, as in reverse drive the inner member 54 thereof is held against rotation.

Referring to FIG. 3, it will be seen that a considerable amount of space saving is inherent in this layout. Firstly, there is only one propeller shaft 27, therefore the driver's seat space can be increased. Even more space saving is achieved by moving the centre differential gear to the locality of the rear axle. Also, there is considerable weight saving in this arrangement as there is no separate centre differential gear casing and there is a reduction in shafts and joints.

The proportions of the annulus and the sunwheel of the centre differential gear are selected so that the torque distribution between the front and rear wheels is unequal. In the above example the torque ratio between the front wheels and the rear wheels is 30/70, providing better drive characteristics. The amount of "creep" in the centre differential gear also affects this slightly, the "creep" being determined by choosing suitable ratios for the front inter-wheel differential gear and the bevel gears 24 and 25.

In prior transmission systems, there is a substantial reduction in speed between propeller shaft and inter-wheel differential gear output. In the above example, however, the main speed reduction is through the pinion 34 and crownwheel 33 and therefore the propeller shaft 27 may rotate at a relatively lower speed. This lower propeller shaft speed reduces problems of shaft whirling and universal joint angularity.

Modifications may be made within the ambit of the invention which is applicable to any four-wheel drive motor vehicle; the center differential gear could be positioned at the front axle and the whole arrangement would be reversed; the front and rear differential gears may be controlled differential gears.

I claim:

1. A transmission unit for a four-wheel drive motor vehicle, the unit including a transmission casing, a centre differential gear in the casing, said centre differential gear have a first input element and two first output elements, an interwheel differential gear in the casing, said interwheel differential gear having a second input element and two second output elements, the axes of said second output elements and at least one of the said first output elements being mutually co-axial, a first driving connection between the said one of the first output elements and said second input element, input element drive means in driving connection with the said first input, first and second mutually co-axial output drive members projecting from opposite sides of the casing and drivingly connected one to one of the said second output elements and the other to the other of the said second output elements, a third output drive member projecting from the casing, and a second driving connection between the third output drive member and the other of said first output elements.

2. A transmission unit according to claim 1, wherein the third output drive member projects from the casing at right angles to the first and second output drive members, and the said second driving connection comprises a tubular shaft sleeving one of the said first and second output drive members, and drive transfer means including first and second drive wheels secured to and co-axial with the said tubular shaft and the third output drive member respectively.

3. A transmission unit according to claim 2, wherein the said first and second drive wheels are mutually meshing bevel gears.

4. A four-wheel drive motor vehicle transmission system having front and rear pairs of road wheels, a transmission unit according to claim 2 whereof the said first and second output drive members are drivingly connected to respective road wheels of one pair of road wheels, a further interwheel differential gear associated with the other pair of road wheels for driving same, a drive shaft providing a drive from the said third output drive member to the further interwheel differential gear, and a prime mover in driving connection with the said input drive means.

5. A transmission system according to claim 4, wherein the ratio of the said further interwheel differential gear and the ratio of the said first and second drive wheels are such that during normal forward drive, when the road wheels are rotating without slip, there is a predetermined percentage rotational overrun of one of the said first output elements relative to the other first output element and including an overrunning clutch device for locking the centre differential gear when the direction of said rotational overrun tends to reverse, said overrunning clutch device having an underrunning member and an overrunning member which members are disposed co-axially with the said second output elements and are drivingly connected one to one element of the centre differential gear and the other to one of the other elements of the centre differential gear.

6. A transmission system according to claim 5, wherein the centre differential gear is a planetary spur-type gear.

7. A transmission system according to claim 6, wherein the said first input element is the planet carrier of the centre differential gear and the said first output elements are the annulus and the sun gear respectively.

8. A transmission system according to claim 7, wherein the ratio of the said further interwheel differential gear and the ratio of the said first and second drive wheels are such that during normal forward drive, when the road wheels are rotating without slip, the said planet carrier overruns the said sun gear, the overruning member of the overrunning clutch device being drivingly connected to the planet carrier and the underrunning member of the overrunning clutch device being drivingly connected to the sun gear.

9. A transmission system according to claim 5, wherein the said overrunning clutch device is a one-way overrunning clutch device.

10. A transmission system according to claim 9, wherein the overrunning clutch device has a set of first and second mutually interleaved friction plates respectively associated with the underrunning and overrunning clutch members for rotation therewith and free axial movement relative thereto, an abutment on one of the clutch members and in an operative position on one side of the friction plates for co-operation with the set during clutching, a presser member on the opposite side of the friction plates from the abutment and axially movable towards the abutment to a first position in which the first and second friction plates are pressed against the abutment and into mutual locking engagement and away from the abutment to a second position in which the first and second friction plates are permitted to slip and rotate relatively to one another, and mutually co-operating presser actuating elements interposed between the presser member and one of the clutch members for moving the presser member to the first position by reaction with the presser member and said last mentioned one of the clutch members when the underrunning member tends to overspeed the overrunning member in one direction of rotation.

11. A transmission system according to claim 10, wherein the said abutment is mounted for movement axially of its associated clutch member away from the presser member to an in-operative position in which the presser member is unable to press the first and second friction plates into mutual locking engagement and towards the presser member to said operative position, and including means for disabling the overrunning clutch device, said disabling means including a carrier disposed adjacent the abutment, and a support element on the carrier and movable relative thereto to a supporting position in which the support element supports the said abutment in the operative position thereof and to a disabling position in which the support element permits movement of the said abutment to the in-operative position thereof.

12. A transmission system according to claim 11, wherein the carrier is mounted co-axially with the said associated clutch member for rotation therewith, and including means for moving the support element to the disabling position when the transmission system is driven in reverse, said last mentioned means comprising a first body member mounted for rotation about the axis of the clutch device, a one-way clutch supporting the first body member in the transmission casing against axial movement and for preventing rotation of the first body member in the same direction of rotation as the said associated clutch member only when the transmission system is driven in reverse, a second body member mounted for rotation about the axis of the clutch device and movable axially thereof, means defining a first cam face on the second body member and engaging the support element for permitting the latter to move to the disabling position upon axial movement of the second body member in one direction, and means defining second and third mutually engaging cam faces on the first and second body members respectively for moving the second body member axially in said one direction upon rotation of the second body member relative to the first body member.

13. A transmission system according to claim 12, wherein the direction of movement of the support member relative to the carrier is radial with respect to the axis of the clutch device.

14. A transmission unit according to claim 1, wherein the said input drive means comprises an input drive member projecting from the casing at right angles to the first and second output drive members, and two mutually meshing bevel gears drivingly connected to and co-axial one with the input drive member and the other with the said first input element.

15. A transmission unit according to claim 1, wherein the said input drive means includes reduction gearing.

16. A transmission unit according to claim 1, wherein the centre differential gear is a planetary spur-type gear.

17. A transmission unit according to claim 16, wherein the said first input element is the planet carrier of the centre differential gear and the said first output elements are the annulus and the sun gear respectively.

18. A transmission unit according to claim 17, wherein the said one of the first output elements is the annulus of the centre differential gear.

19. A four-wheel drive motor vehicle having front and rear pairs of road wheels, a transmission unit according to claim 1, the transmission unit being disposed in the vehicle with the said first and second output drive members extending transversely of the vehicle and drivingly connected to respective ones of one pair of road wheels, a further interwheel differential gear associated with the other pair of road wheels for driving same, a propeller shaft extending longitudinally of the vehicle and providing a driving connection between the said third output drive member and the further interwheel differential gear, and an engine positioned in the vehicle adjacent the said transmission unit and having an output drive connected to the said drive means.

20. A four-wheel drive motor vehicle according to claim 19, wherein the said one pair of road wheels is the rear pair of road wheels.

21. A four-wheel drive motor vehicle according to claim 20, including a change-speed gear box interposed in the connection between the said output drive and the said input drive means.

References Cited

UNITED STATES PATENTS

| Re. 25,269 | 10/1962 | Christie | 180—22 |
| 2,603,108 | 7/1952 | Carlson | 180—22 X |
| 3,324,965 | 6/1967 | Koch et al. | 180—22 |

A. HARRY LEVY, *Primary Examiner.*